(12) United States Patent
Kodo

(10) Patent No.: US 9,885,867 B2
(45) Date of Patent: Feb. 6, 2018

(54) IMAGE FORMING APPARATUS WITH MIRROR ADJUSTMENT UNIT

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Masahiro Kodo, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/816,216

(22) Filed: Aug. 3, 2015

(65) Prior Publication Data

US 2017/0038702 A1 Feb. 9, 2017

(51) Int. Cl.
*G03G 15/04* (2006.01)
*G02B 7/198* (2006.01)
*G02B 26/12* (2006.01)
*G02B 7/182* (2006.01)
*G03G 21/16* (2006.01)

(52) U.S. Cl.
CPC ......... *G02B 26/121* (2013.01); *G02B 7/1827* (2013.01); *G02B 7/198* (2013.01); *G02B 26/125* (2013.01); *G03G 15/0409* (2013.01); *G03G 15/04036* (2013.01); *G03G 21/1666* (2013.01)

(58) Field of Classification Search
CPC .......... G03G 15/043; G03G 15/04036; G02B 26/121; G02B 26/125; G02B 7/1827; G02B 7/198
See application file for complete search history.

(56) References Cited

U.S. PATENT DOCUMENTS

2006/0051134 A1* 3/2006 Ahn .................. G03G 15/0121
399/222
2012/0182368 A1* 7/2012 Kojima ................ G02B 26/123
347/118
2015/0309438 A1 10/2015 Kodo et al.

FOREIGN PATENT DOCUMENTS

JP 2006017947 A * 1/2006

* cited by examiner

*Primary Examiner* — David M Gray
*Assistant Examiner* — Laura Roth
(74) *Attorney, Agent, or Firm* — Amin, Turocy & Watson LLP

(57) ABSTRACT

In accordance with an embodiment, an image forming apparatus includes a first supporting unit and a second supporting unit, a first drive source, and a first and a second transmission unit. The first drive source is configured to provide a first drive force in a first direction and a second drive force in a second direction. When the first drive source provides the first drive force, the first transmission unit allows the first supporting unit to move by transmission of the first drive force and allows the second supporting unit to be in a stopped state by non-transmission of the first drive force. When the first drive source provides the second drive force, the second transmission unit allows the second supporting unit to move by transmission of the second drive force and allows the first supporting unit to be in a stopped state by non-transmission of the second drive force.

10 Claims, 8 Drawing Sheets

IMAGE FORMING APPARATUS WITH MIRROR ADJUSTMENT UNIT

FIELD

Embodiments described herein relate to an image forming apparatus.

BACKGROUND

An image forming apparatus is known which forms an image with a color toner. By irradiating the surface of a photoconductive drum with scanning beams, the image forming apparatus forms an electrostatic latent image on the photoconductive drum. The image forming apparatus develops the electrostatic latent image into a toner image.

For example, the image forming apparatus is equipped with a plurality of photoconductive drums. The image forming apparatus separately irradiates each photoconductive drum with scanning beams. The toner images on the photoconductive drums are required to be accurately aligned in relative position between the photoconductive drums. Particularly, the quality of the image is degraded when the scan positions of the scanning beams are not parallel.

Thus, in the image forming apparatus, the positions of a plurality of mirrors for reflecting scanning beams are adjusted. The adjustment is carried out while the positions of the scanning beams are measured. A position adjustment unit for changing the position of a mirror is arranged inside the image forming apparatus.

However, more than four scanning beams are needed to form a full-color image. More than three position adjustment units each of which is equipped with a motor are needed to adjust the positions of mirrors. The configuration of the motors and motor control circuits increases the cost of the image forming apparatus.

DETAILED DESCRIPTION

In accordance with an embodiment, an image forming apparatus comprises an optical scanning unit, a first reflecting mirror, a second reflecting mirror, a first supporting unit, a second supporting unit, a first drive source, a first transmission unit and a second transmission unit. The optical scanning unit generates a first scanning beam for forming a latent image at a first scan position and a second scanning beam for forming a latent image at a second scan position. The first reflecting mirror guides the first scanning beam to the first scan position. The second reflecting mirror guides the second scanning beam to the second scan position. The first supporting unit movably supports, in a direction intersecting with the length direction of the first reflecting mirror, an end of the first reflecting mirror in the length direction of the first reflecting mirror. The second supporting unit movably supports, in a direction intersecting with the length direction of the second reflecting mirror, an end of the second reflecting mirror in the length direction of the second reflecting mirror. When the first drive source provides a drive force in a first direction, the first transmission unit transmits the movement of the first drive source to the first supporting unit. When the first drive source provides a drive force in a second direction, the second transmission unit transmits the movement of the first drive source to the second supporting unit.

(Embodiment)

The image forming apparatus 100 of the present invention is described below with reference to accompanying drawings in each of which identical reference signs denote identical components unless specified otherwise.

Figure 1:
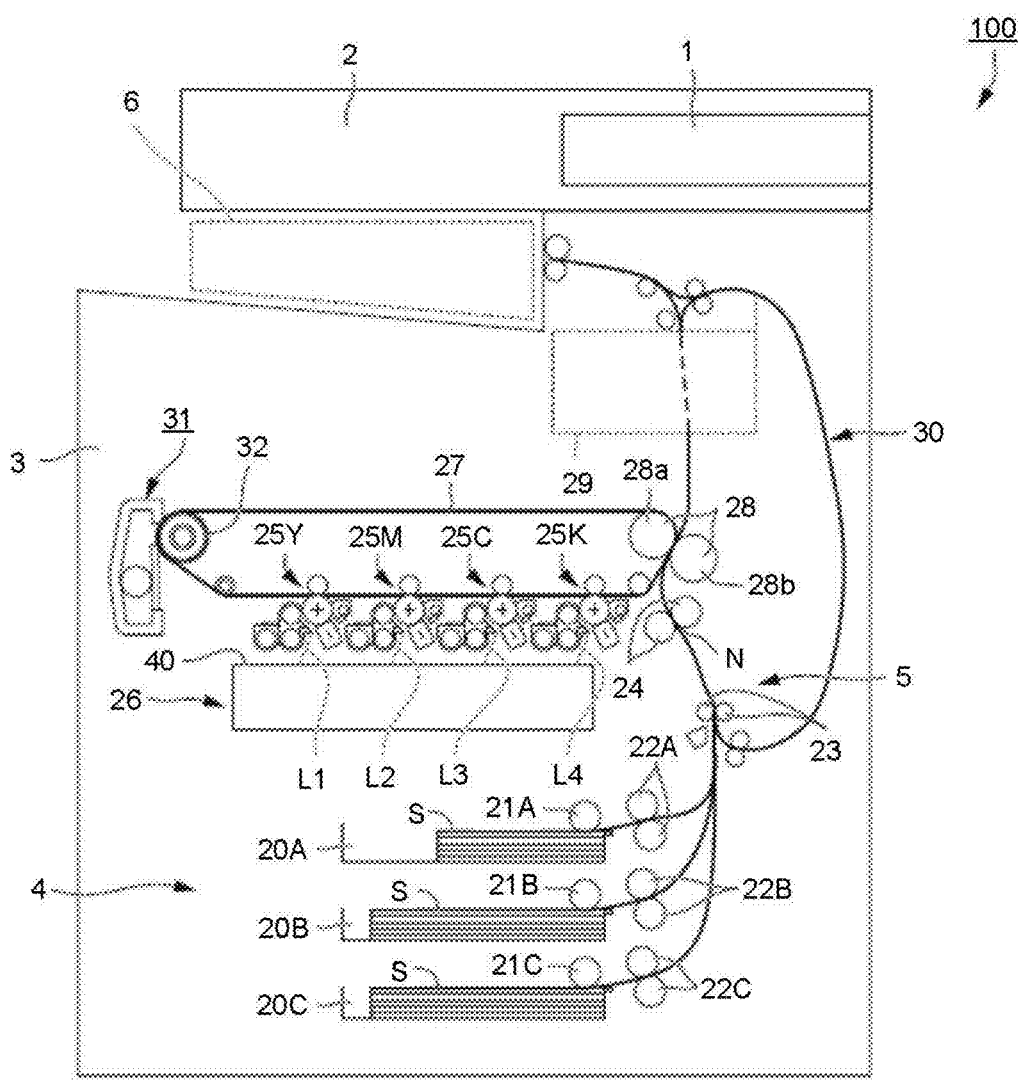
FIG. 1 is a sectional schematic diagram exemplifying the whole structure of an image forming apparatus according to an embodiment.
Figure 2:
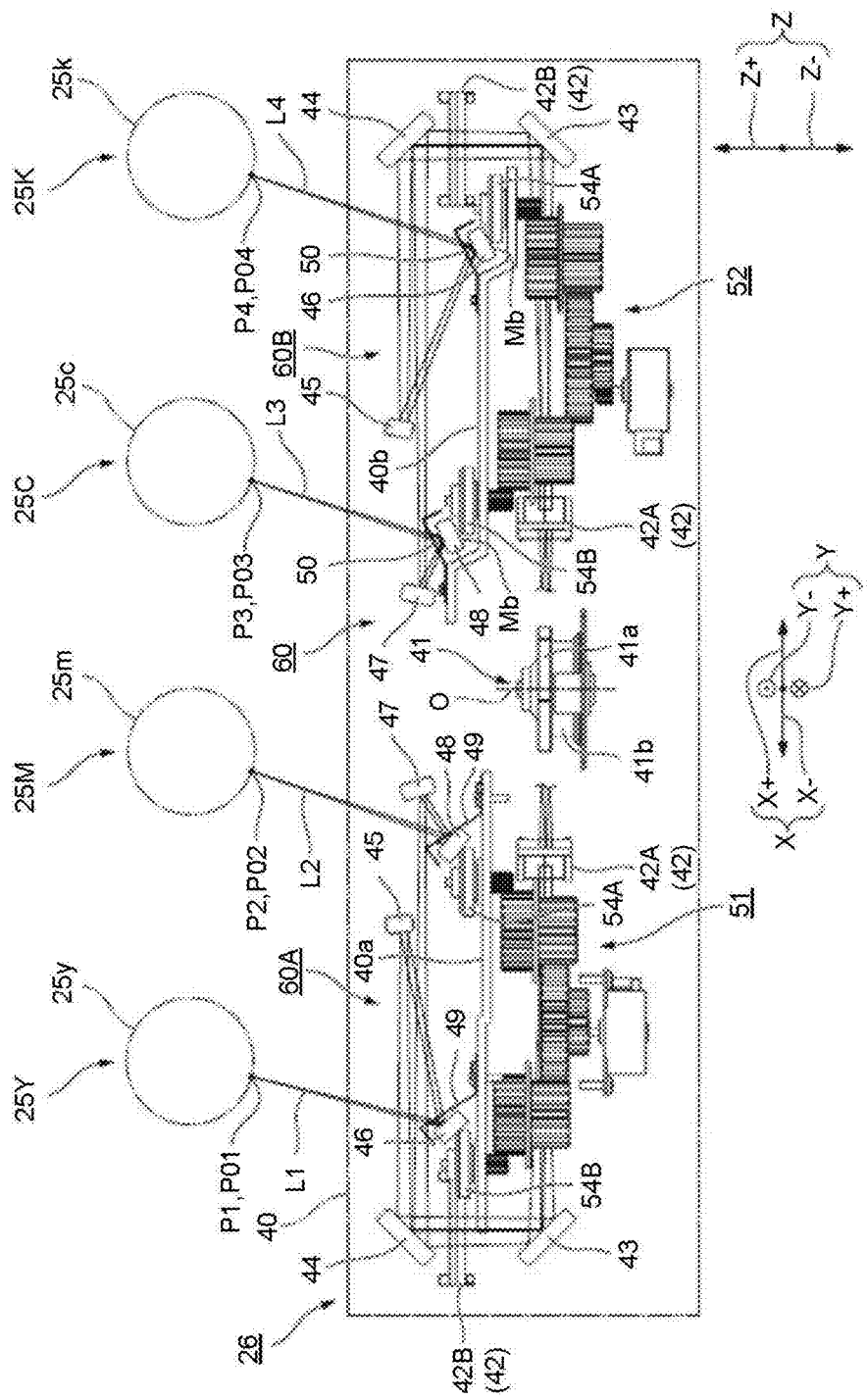
FIG. 2 is a schematic diagram illustrating the structure of the laser scanning unit of an image forming apparatus according to an embodiment.
Figure 3:
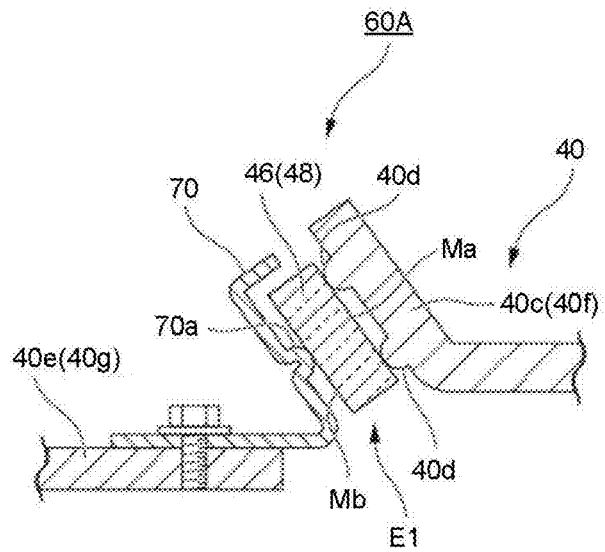
FIG. 3 is a sectional schematic diagram exemplifying the supported state of a first end of a mirror of an image forming apparatus according to an embodiment.
Figure 4:
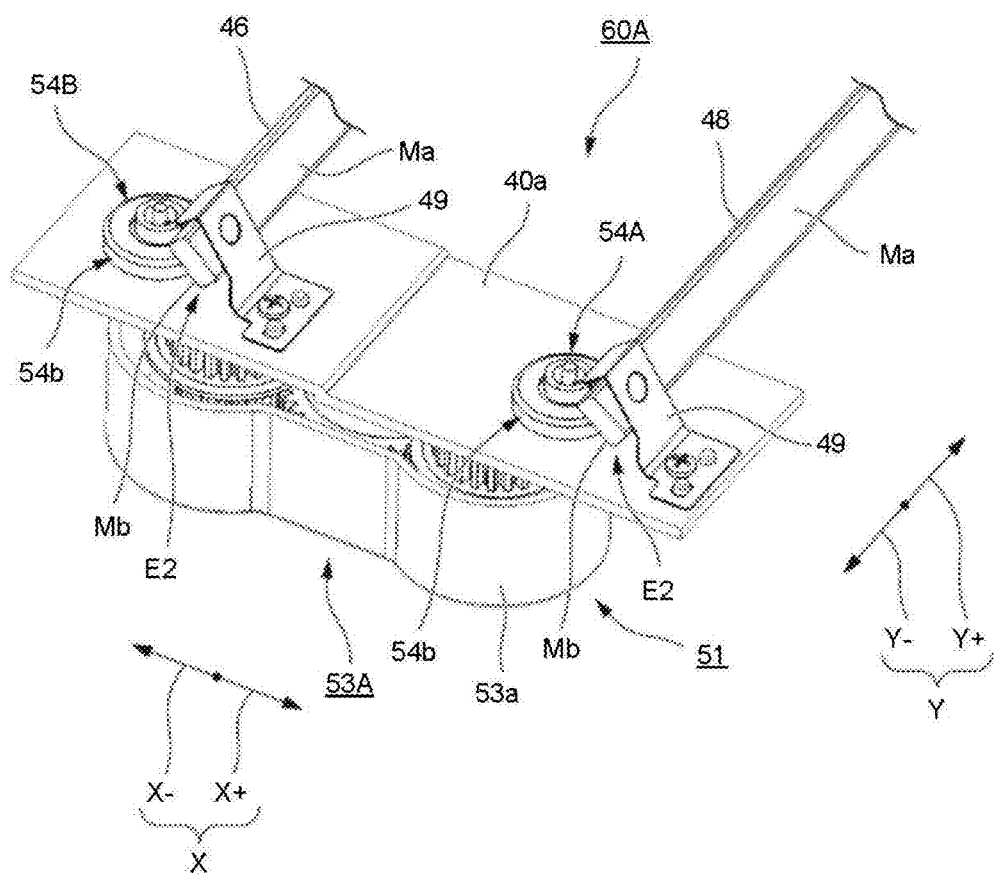
FIG. 4 is a schematic diagram three-dimensionally exemplifying the structure of a mirror position adjustment section of the laser scanning unit of an image forming apparatus according to an embodiment.
Figure 5:
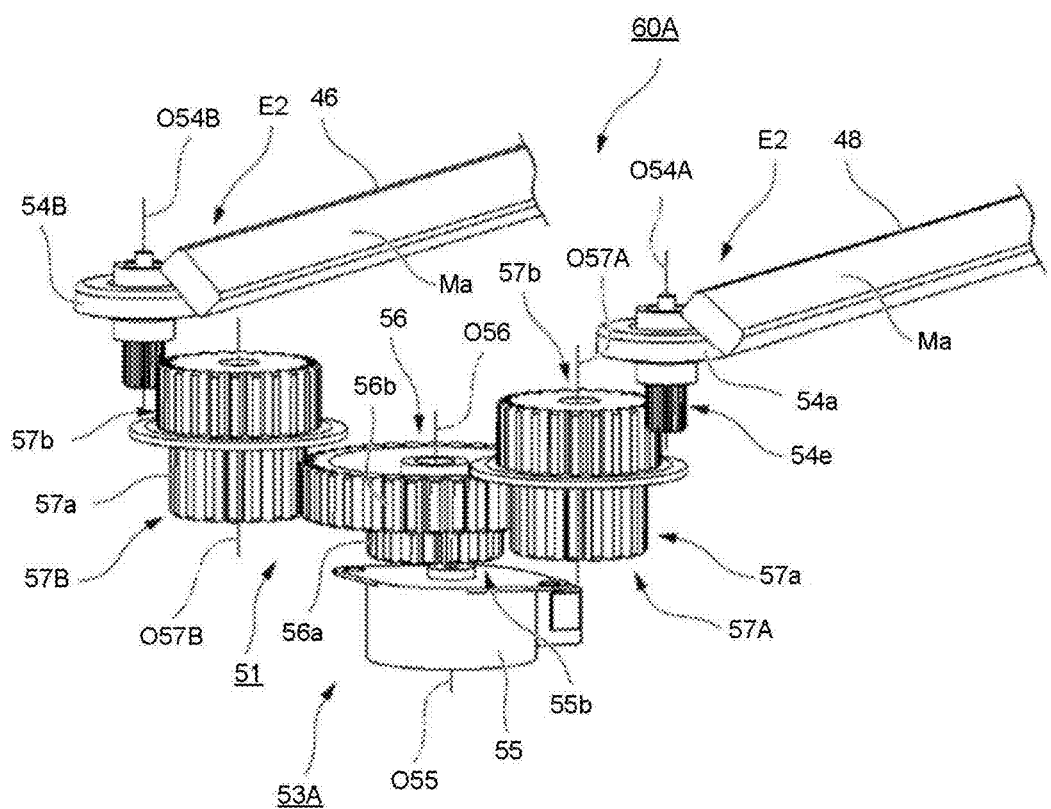
FIG. 5 is a schematic diagram three-dimensionally exemplifying the structure of a mirror position adjustment section of the laser scanning unit of an image forming apparatus according to an embodiment.
Figure 6A:
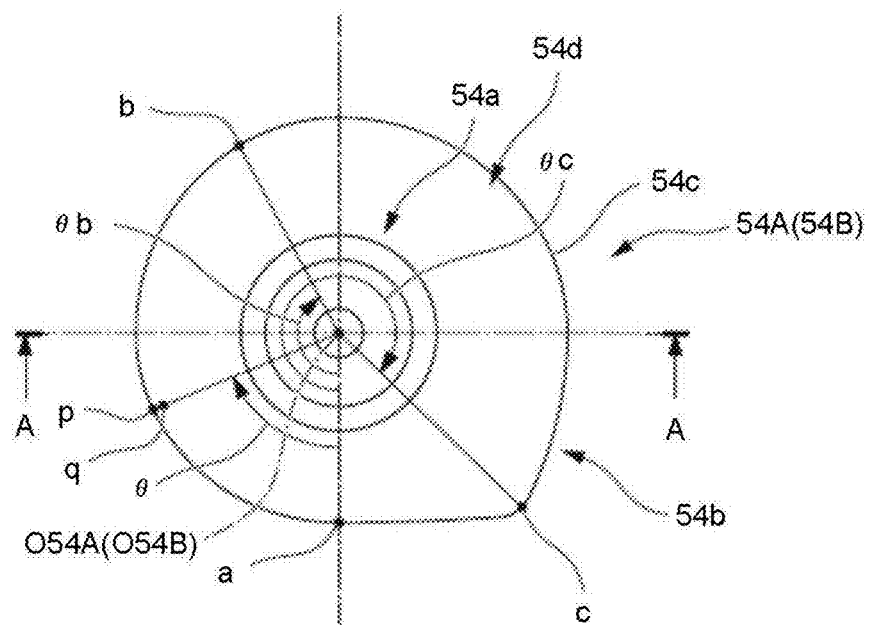
FIG. 6A is a plane view illustrating a cam used by the mirror position adjustment section of an image forming apparatus according to an embodiment.
Figure 6B:
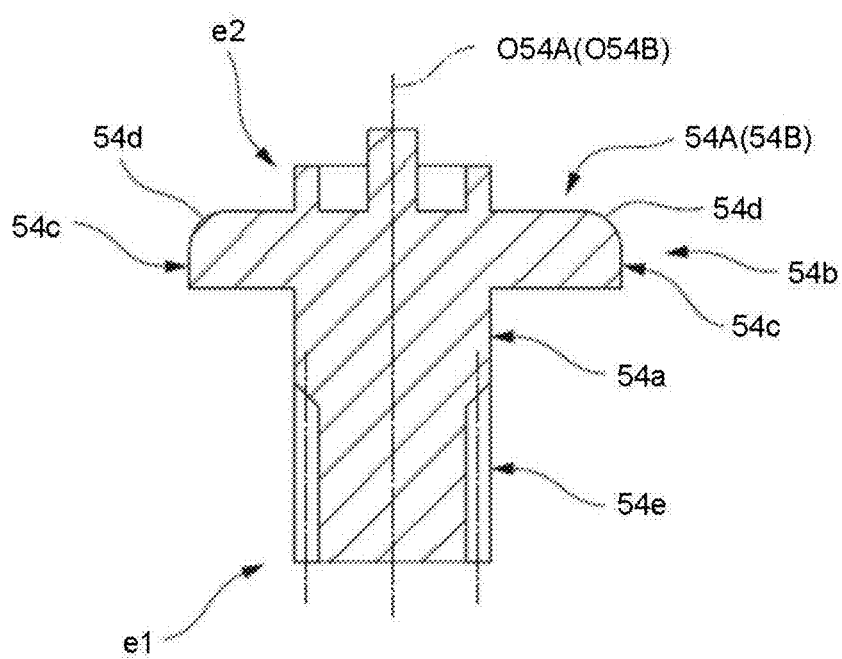
FIG. 6B is a schematic diagram illustrating a section taken along the line A-A shown in FIG. 6A.
Figure 7:
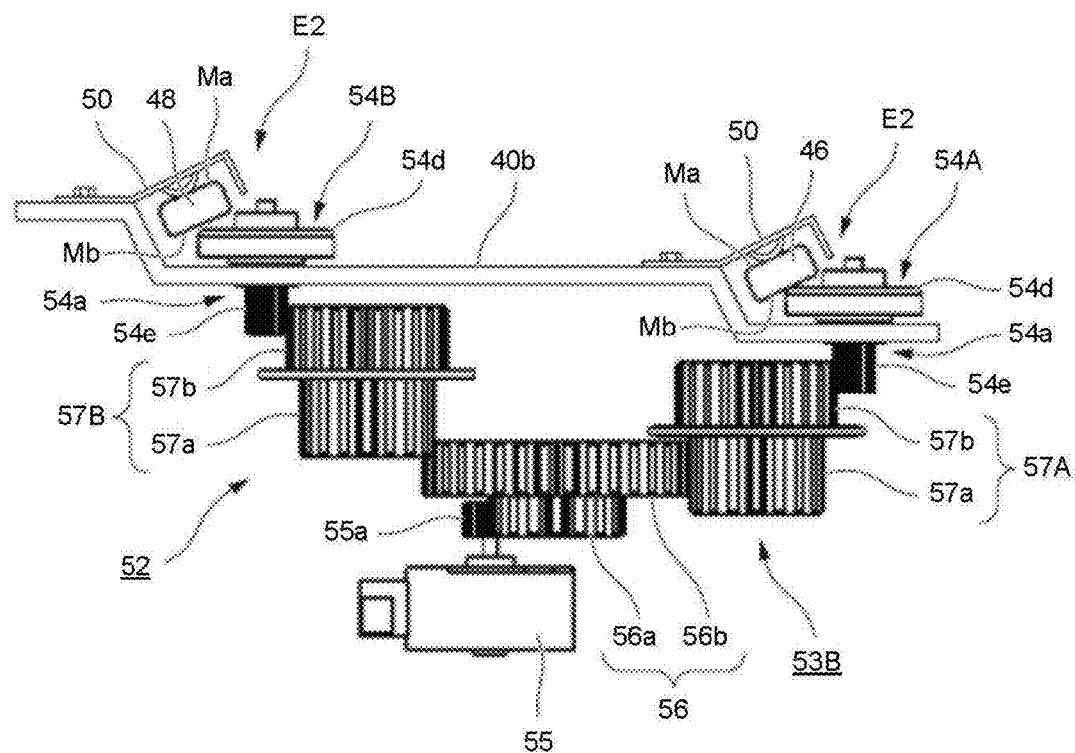
FIG. 7 is a schematic diagram illustrating the main structures of the other mirror position adjustment sections of the laser scanning unit of an image forming apparatus according to an embodiment.
Figure 8A:
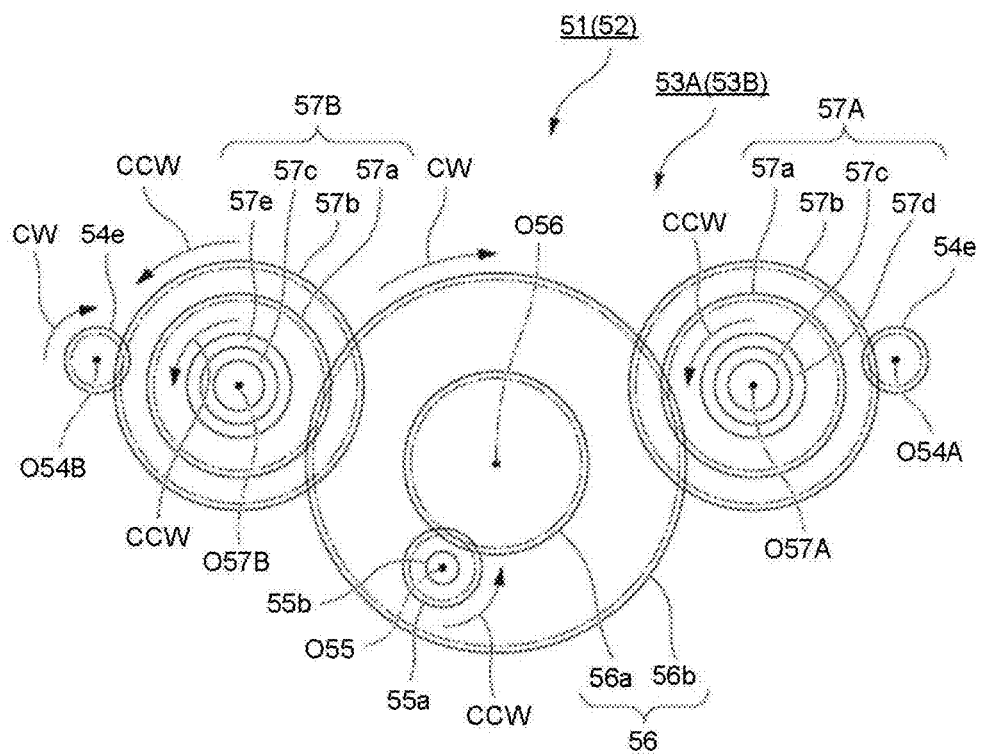
FIG. 8A is a schematic diagram illustrating the gear configuration of a mirror position adjustment section of an image forming apparatus according to an embodiment.

FIG. 1 is a sectional schematic diagram exemplifying the whole structure of an image forming apparatus according to an embodiment. FIG. 2 is a schematic diagram illustrating the structure of the laser scanning unit of an image forming apparatus according to an embodiment. FIG. 3 is a sectional schematic diagram exemplifying the supported state of a first end of a mirror of an image forming apparatus according to an embodiment. FIG. 4 is a schematic diagram three-dimensionally exemplifying the structure of a mirror position adjustment section of the laser scanning unit of an image forming apparatus according to an embodiment. FIG. 5 is a schematic diagram three-dimensionally exemplifying the structure of a mirror position adjustment section of the laser scanning unit of an image forming apparatus according to an embodiment. FIG. 6A is a plane view illustrating a cam used by the mirror position adjustment section of an image forming apparatus according to an embodiment. FIG. 6B is a schematic diagram illustrating a section taken along the line A-A shown in FIG. 6A. FIG. 7 is a schematic diagram illustrating the main structures of the other mirror position adjustment sections of the laser scanning unit of an image forming apparatus according to an embodiment. FIG. 8A is a schematic diagram illustrating the gear configuration of a mirror position adjustment section of an image forming apparatus according to an embodiment.

As shown in FIG. 1, in accordance with an embodiment, an image forming apparatus 100 comprises a control panel 1, a scanner unit 2, a printer unit 3, a sheet feed unit 4, a conveyance unit 5 and a controller 6.

The control panel 1 is operated by the user to activate the image forming apparatus 100.

The scanner unit 2 reads the image information of a copied object as light intensity and outputs the read image information to the printer unit 3.

The printer unit 3 forms an output image (hereinafter referred to as a toner image) with a developing agent containing a toner according to the image information read by the scanner unit 2 or the image information received from the outside.

The printer unit 3 transfers the toner image onto the surface of a sheet S. The printer unit 3 applies heat and pressure to the toner image on the surface of the sheet S to fix the toner image on the sheet S.

The sheet feed unit 4 feeds sheets, one by one, to the printer unit 3 matching in timing with the formation of a toner image by the printer unit 3. The sheet feed unit 4 includes a plurality of paper cassettes 20A, 20B and 20C. Sheets S of given sizes and given types are separately accommodated in the paper cassettes 20A, 20B and 20C. The paper cassettes 20A, 20B and 20C are equipped with pickup rollers 21A, 21B and 21C, respectively. The pickup rollers 21A, 21B and 21C pick up sheets successively from the paper cassettes 20A and 20B and 20C, respectively. The pickup rollers 21A, 21B and 21C feed the picked up sheets to the conveyance unit 5.

The conveyance unit 5 is provided with a conveyance roller 23 and a resist roller 24. The conveyance unit 5 conveys the sheets fed from the pickup rollers 21A, 21B and 21C to the resist roller 24. The resist roller 24 conveys the sheet S according to the timing at which the printer unit 3 transfers a toner image onto the surface of the sheet S.

The conveyance roller 23 causes the front end of a sheet S in a sheet conveyance direction to prop against the nip N of the resist roller 24. The conveyance roller 23 aligns the positions of the front ends of the sheets S in the sheet conveyance direction by curving the sheets S.

The resist roller 24 matches the front end of a sheet S with the nip N. Further, the resist roller 24 conveys the sheet S to a transfer unit 28 which is described later.

Next, the detailed structure of the printer unit 3 is described below.

The printer unit 3 comprises image forming units 25Y, 25M, 25C and 25K, a laser scanning unit 26, an intermediate transfer belt 27, a transfer unit 28, a fixer 29 and a transfer belt cleaning unit 31.

Each of the image forming units 25Y, 25M, 25C and 25K forms a toner image on the intermediate transfer belt 27.

As shown in FIG. 2, the image forming units 25Y, 25M, 25C and 25K are provided with photoconductive drums 25y, 25m, 25c and 25k, respectively. The image forming units 25Y, 25M, 25C and 25K form yellow, magenta, cyan and black toner images on the photoconductive drums 25y, 25m, 25c and 25k, respectively.

The photoconductive drums 25y, 25m, 25c and 25k are arranged parallel to each other at intervals. The axes of the photoconductive drums 25y, 25m, 25c and 25k are orthogonal to the direction along which a sheet passes the printer unit 3.

A charger, a developer, a transfer roller, a cleaning unit and a destaticizer which are generally known are arranged around each of the photoconductive drums 25y, 25m, 25c and 25k. The transfer roller is arranged opposite to the photoconductive drum. The intermediate transfer belt 27 which is described later is positioned between the transfer roller and the photoconductive drum. A laser scanning unit 26 is arranged below the charger and the developer.

The laser scanning unit 26 irradiates the surfaces of the photoconductive drums 25y, 25m, 25c and 25k with laser beams L1, L2, L3 and L4. Yellow, magenta, cyan and black image information is provided to the laser scanning unit 26.

The laser beams L1, L2, L3 and L4 are modulated according to the yellow image information, the magenta image information, the cyan image information and the black image information, respectively.

The laser beams L1, L2, L3 and L4 scan the surfaces of the photoconductive drums 25y, 25m, 25c and 25k, respectively. The laser beam L1 (a first scanning beam) scans a scan position P1 (a first scan position) on a line along the axis direction of the photoconductive drum 25y. The laser beam L2 (a second scanning beam) scans a scan position P2 (a second scan position) on a line along the axis direction of the photoconductive drum 25m. The laser beam L3 (a third scanning beam) scans a scan position P3 (a third scan position) on a line along the axis direction of the photoconductive drum 25c. The laser beam L4 (a fourth scanning beam) scans a scan position P4 (a fourth scan position) on a line along the axis direction of the photoconductive drum 25k.

The scan positions P1, P2, P3 and P4 extend parallel to each other. As the laser scanning unit 26 bears a component error and an assembly error, the actual scan positions P1, P2, P3 and P4 of the laser beams L1, L2, L3 and L4 may be deviated from targeted scan positions.

The parts of the surfaces of the photoconductive drums 25y, 25m, 25c and 25k exposed by the laser beams L1, L2, L3 and L4 are charge-removed. The laser beams L1, L2, L3 and L4 form electrostatic latent images on the surfaces of the photoconductive drums 25y, 25m, 25c and 25k according to image information, respectively.

The laser scanning unit 26 comprises a housing 40, a laser light source (not shown) and an optical write system 60.

The housing 40 fixes the laser light source (not shown) and the optical write system 60 in line with a given position relationship.

The laser light source includes four laser diodes (hereinafter referred to as LDs), the drive circuit of each LD and the collimating lens of each LD. After passing the collimating lens, the laser lights generated by the laser light source become parallel beams. The laser light source is fixed on a lateral side of the housing 40.

The optical write system 60 is equipped with a cylindrical lens (not shown), a polygon motor 41, an fθ lens 42 and a mirror.

The cylindrical lens causes each laser beam from the laser light source to form an image linearly. The cylindrical lens is configured between the laser light source and the polygon motor 41.

The polygon motor 41 carries out a deflective scan using each laser beam. The polygon motor 41 rotates a rotor 41b on which a polygon mirror 41a is fixed. The polygon mirror 41a has a plurality of deflecting surfaces which are the same distance away from the rotation axis O of the rotor 41b.

When observed around the rotation axis O, the plurality of deflecting surfaces is arranged into a regular polygon. The polygon motor 41 may be a DC motor.

In an embodiment, only one polygon motor 41 is configured. Further, the polygon motor 41 distributes the laser beams L1 and L2 and the laser beams L3 and L4 towards opposite directions. The polygon motor 41 is configured in the center of the under surface of the housing 40. The rotation axis O of the polygon mirror 41a extends in the vertical direction.

It is described below that the targeted scan positions P01, P02, P03 and P04 of the scan positions P1, P2, P3 and P4 are successively arranged in the same horizontal plane. As the distance between the scan position and the targeted scan position is small, each scan position and a corresponding targeted scan position are overlapped with each other in the scale of FIG. 2. The targeted scan positions P01, P02, P03 and P04 are hereinafter referred to as scan positions P01, P02, P03 and P04 for short if no misunderstanding is caused.

The direction from the scan position P01 to the scan position P04 on a straight line orthogonal to all the scan positions P01, P02, P03 and P04 (the direction from the left side of FIG. 2 to the right side of FIG. 2) is referred to as a scan position arrangement direction.

In the laser scanning unit 26 of the embodiment, the direction along the vertical direction is referred to as a Z direction. The Z direction is a direction along the normal of a plane in which the targeted scan positions P01, P02, P03 and P04 are arranged. As to the Z direction, in some cases, the direction extending upwards vertically is referred to as a Z+ direction, and the direction extending downwards vertically is referred to as a Z− direction. The direction of the axis extending along the arrangement direction of the scan positions P01, P02, P03 and P04 is referred to an X direction. As to the X direction, the direction along which the scan positions P01, P02, P03 and P04 are orderly arranged is referred to as an X+ direction, and the direction opposite to the arrangement direction of the scan positions is referred to as an X− direction. Further, the direction orthogonal to the Z direction and the X direction is referred to as a Y direction. As to the Y direction, in some cases, the direction facing the far side shown in FIG. 2 is referred to as a Y+ direction, and the direction facing the near side shown in FIG. 2 is referred to as a Y− direction.

Further, the area extending towards the X+ direction from the vertical plane which is orthogonal to the arrangement direction of the scan positions and on which the rotation axis O of the polygon mirror 41a is contained is referred to as an X+ side area, and the area extending towards the X− direction from the vertical plane which is orthogonal to the arrangement direction of the scan positions and on which the rotation axis O of the polygon mirror 41a is contained is referred to as an X− side area.

A first optical system 60A for guiding the laser beams L1 and L2 to the scan positions P1 and P2 is arranged in the X− side area. A second optical system 60B for guiding the laser beams L3 and L4 to the scan positions P3 and P4 is arranged in the X+ side area.

The first optical system 60A and the second optical system 60B both include an fθ lens 42 as an optical element. The first optical system 60A and the second optical system 60B both include a first mirror 43, a second mirror 44, a third mirror 45, a fourth mirror 46, a fifth mirror 47 and a sixth mirror 48 as optical elements. As an example, the first optical system 60A and the second optical system 60B may share a plurality of mirrors. The plurality of mirrors can also be changed in the size and the shape of an effective reflecting surface according to the light beam diameter at a configuration position.

A primary scanning direction and a secondary scanning direction are sometimes mentioned in the following description of a direction in a section orthogonal to the optical axis of each laser beam. The primary scanning direction is the direction in which a laser beam is moved through the rotation of the polygon mirror 41a. The secondary scanning direction is a direction orthogonal to the primary scanning direction.

First, the structure of the first optical system 60A is described along an optical path.

The laser beams L1 and L2 passing the cylindrical lens are imaged on the polygon mirror 41a. The cylindrical lens causes the laser beams L1 and L2 to be imaged in the secondary scanning direction. The imaging positions of the laser beams L1 and L2 are deviated from each other in the Z direction. The imaged laser beams L1 and L2 are deflected towards the horizontal plane in the X− side area through the polygon mirror 41a. When the polygon mirror 41a rotates, the laser beams L1 and L2 carry out an equiangular scan in the horizontal plane. The laser beams L1 and L2 are diverged in the secondary scanning direction.

A first lens 42A is configured in the X− direction with respect to the polygon motor 41. The optical axes of the laser beams L1 and L2 transmitted to the first lens 42A are separated from each other in the secondary scanning direction across the optical axis of the first lens 42A. The laser beams L1 and L2 passing the first lens 42A are converged towards the primary scanning direction and the secondary scanning direction through the refraction power of the first lens 42A. Further, the laser beams L1 and L2 passing the first lens 42A are refracted towards a direction approaching to the optical axis of the first lens 42A.

The first mirror 43 is arranged at a distance from the first lens 42A. The first mirror 43 is located in the X-direction with respect to the first lens 42A. The first mirror 43 and the first lens 42A are arranged opposite to each other in the X direction. The first mirror 43 extends parallel to the Y direction. The two ends of the first mirror 43 in the length direction (the Y direction) of the first mirror 43 are fixed on the housing 40 through pressure springs (not shown).

The first mirror 43 reflects the laser beams L1 and L2 towards the Z+ direction.

A second lens 42B is arranged on the optical paths of the laser beams L1 and L2 reflected by the first mirror 43. The laser beams L1 and L2 passing the second lens 42B are converged towards the primary scanning direction and the secondary scanning direction through the refraction of the second lens 42B. Further, the laser beams L1 and L2 passing the second lens 42B are refracted towards a direction approaching to the optical axis of the second lens 42B. Moreover, the optical axes of the laser beams L1 and L2 enter the vertical plane in such a manner that the optical axes are separated from each other in the secondary scanning direction across the optical axis of the second lens 42B.

The second mirror 44 is arranged at a distance from the second lens 42B. The second mirror 44 is located in the Z+ direction with respect to the first lens 42B. The second mirror 44 and the first mirror 43 are arranged opposite to each other across the second lens 42B in the Z direction. The second mirror 44 extends parallel to the Y direction. The two ends of the second mirror 44 in the length direction of the second mirror 44 (the Y direction) are fixed on the housing 40 via pressure springs (not shown).

The second mirror 44 reflects the laser beams L1 and L2 towards the X+ direction.

The third mirror 45 is arranged at a distance from the second mirror 44. The third mirror 45 is located in the X+ direction with respect to the second mirror 44. The third mirror 45 only reflects the laser beam L1 reflected by the second mirror 44. The direction of the reflection of the laser beam L1 from the third mirror 45 is an inclined direction which advances in the X− direction and the Z-direction from the third mirror 45. The third mirror 45 extends parallel to the Y direction. The two ends of the third mirror 45 in the length direction of the third mirror 45 (the Y direction) are fixed on the housing 40 via pressure springs (not shown).

The fifth mirror 47 is arranged at a distance from the second mirror 44. For the second mirror 44, the fifth mirror 47 is also located in the X+ direction when compared with the third mirror 45. The fifth mirror 47 only reflects the laser beam L2 reflected by the second mirror 44. The direction of the reflection of the laser beam L2 from the fifth mirror 47 is an inclined direction which advances in the X− direction and the Z− direction from the fifth mirror 47. The fifth mirror 47 extends parallel to the Y direction. The two ends of the fifth mirror 47 in the length direction of the fifth mirror 47 (the Y direction) are fixed on the housing 40 via pressure springs (not shown).

A fourth mirror 46 (a first reflecting mirror) is arranged on the optical path of the laser beam L1 reflected by the third mirror 45. The fourth mirror 46 extends towards the Y direction. The fourth mirror 46 reflects the laser beam L1 towards the scan position P1 on the photoconductive drum 25y. In an embodiment, as an example, in the X direction, the fourth mirror 46 is closer to the X− direction when compared with the scan position P1.

The two ends of the fourth mirror 46 in the length direction of the fourth mirror 46, that is, a first end E1 (refer to FIG. 3) and a second end E2 (refer to FIG. 4), are fixed using different methods. The first end E1 is the end in the length direction of the fourth mirror 46 which is closer to the Y+ direction with respect to the center of the fourth mirror 46. The second end E2 is the end in the length direction of the fourth mirror 46 which is closer to the Y− direction with respect to the center of the fourth mirror 46.

As shown in FIG. 3, the first end E1 of the fourth mirror 46 is fixed, via a pressure spring 70, on a mirror supporting unit 40c formed on the housing 40.

The mirror supporting unit 40c has two supporting protrusions 40d for supporting the reflecting surface Ma of the fourth mirror 46. The reflecting surface Ma of the fourth mirror 46 is propped against the two supporting protrusions 40d.

The pressure spring 70 for fixing the fourth mirror 46 is fixed on the spring fixing section 40e which is formed on the housing 40 nearby the mirror supporting unit 40c. The pressure spring 70 for fixing the fourth mirror 46 presses the back Mb of the fourth mirror 46 opposite to the reflecting surface Ma via a pressing section 70a.

As shown in FIG. 4, the second end E2 of the fourth mirror 46 is movably fixed via a cam 54B (a first supporting unit) of a first mirror adjustment section 51 and a pressure spring 49 which are described later.

The cam 54B can be rotationally supported on a plate-shaped first supporting unit 40a in the housing 40. In the housing 40, the first supporting unit 40a is located on the end in the X− side area which is close to the Y− direction. The cam 54B is propped against the back Mb of the second end E2 of the fourth mirror 46.

The pressure spring 49 is fixed on the first supporting unit 40a. The pressure spring 49 presses the reflecting surface Ma of the fourth mirror 46. The position pressed by the pressure spring 49 is opposite to the propped part of the cam 54B on the back Mb across the fourth mirror 46.

The first mirror adjustment section 51 which is described later adjusts the position of the second end E2 of the fourth mirror 46 by rotating the cam 54B. After the position adjustment, the scan position P1 of the laser beam L1 reflected by the fourth mirror 46 is parallel to the targeted scan position P01.

The detailed structure of the cam 54B is described later as the structure of the first mirror adjustment section 51 is described.

As shown in FIG. 2, a sixth mirror 48 (a second reflecting mirror) is arranged on the optical path of the laser beam L2 reflected by the fifth mirror 47.

The two ends of the sixth mirror 48 in the length direction of the sixth mirror 48, that is, a first end E1 (refer to FIG. 3) and a second end E2 (refer to FIG. 4), are fixed using different methods. The first end E1 is the end in the length direction of the sixth mirror 48 which is closer to the Y+ direction with respect to the center of the sixth mirror 48. The second end E2 is the end in the length direction of the sixth mirror 48 which is closer to the Y− direction with respect to the center of the sixth mirror 48.

As shown in FIG. 3, the first end E1 of the sixth mirror is fixed, via the pressure spring 70, on a mirror supporting unit 40f formed on the housing 40.

The mirror supporting unit 40f has two supporting protrusions 40d for supporting the reflecting surface Ma of the sixth mirror 48. The reflecting surface Ma of the sixth mirror 48 is propped against the two supporting protrusions 40d. The angle of inclination of the reflecting surface Ma of the sixth mirror 48 with respect to the horizontal plane may be different from that of inclination of the fourth mirror 46.

The pressure spring 70 for fixing the sixth mirror 48 is fixed on the spring fixing section 40g which is formed on the housing 40 nearby the mirror supporting unit 40f. The pressure spring 70 for fixing the sixth mirror 48 presses the back Mb of the sixth mirror 48 opposite to the reflecting surface Ma via a pressing section 70a.

The sixth mirror 48 is fixed in the housing 40 at a position different from the fixation position of the fourth mirror 46. Sometimes, the angle of inclination of the sixth mirror 48 with respect to the horizontal plane is different from that of inclination of the fourth mirror 46. The sixth mirror 48 is fixed in the housing 40 in the same manner as the fourth mirror 46 in the other aspects. The sixth mirror 48 is fixed closer to the X+ direction than the fourth mirror 46.

As shown in FIG. 4, the second end E2 of the sixth mirror 48 is movably fixed via a cam 54A (a second supporting unit) of the first mirror adjustment section 51 and a pressure spring 49 which are described later.

The cam 54A is rotationally supported on a plate-shaped first supporting unit 40a in the housing 40. The cam 54A is propped against the back Mb of the second end E2 of the sixth mirror 48.

The pressure spring 49 for fixing the sixth mirror 48 is fixed on the first supporting unit 40a. The pressure spring 49 presses the reflecting surface Ma of the sixth mirror 48. The position pressed by the pressure spring 49 is opposite to the propped part of the cam 54A on the back Mb across the sixth mirror 48.

The first mirror adjustment section 51 which is described later adjusts the position of the second end E2 of the sixth mirror 48 by rotating the cam 54A. After the position adjustment, the scan position P2 of the laser beam L2 reflected by the sixth mirror 48 is parallel to the targeted scan position P01.

The detailed structure of the cam 54A is described later as the structure of the first mirror adjustment section 51 is described.

Sequentially, the structure of the second optical system 60B is described centering on the difference from those of the first optical system 60A.

As shown in FIG. 2, except the fourth mirror 46 and the sixth mirror 48, the other optical elements of the second optical system 60B and the first optical system 60A which are denoted by the same reference signs are configured symmetrically with respect to a plane which contains the rotation axis O of the polygon motor 41 and is orthogonal to the X direction. It is not necessary to configure the optical elements of the first optical system 60A and the second optical system 60B, excluding the fourth mirror 46 and the sixth mirror 48, strictly symmetrically with respect to the symmetric plane. For example, based on the configuration space in the housing 40, the optical elements of the first optical system 60A and the second optical system 60B may be configured at positions deviated from planar symmetrical positions, without changing the lengths of optical paths.

The fθ lens 42, the first mirror 43, the second mirror 44, the third mirror 45 and the fifth mirror 47 in the second optical system 60B replace those of the first optical system 60A denoted by the same reference signs. The laser beams L1 and L2 are replaced by the laser beams L3 and L4. The scan positions P1 and P2 are replaced by the scan positions P3 and P4. The X− direction is replaced by the X+ direction. The X+ direction is replaced by the X− direction.

The configuration of the fourth mirror 46 and the sixth mirror 48 of the second optical system 60B is described below.

The fourth mirror 46 (a fourth reflecting mirror) in the second optical system 60B is arranged on the optical path of the laser beam L4 reflected by the third mirror 45. The fourth mirror 46 reflects the laser beam L4 towards the scan position P4 on the photoconductive drum 25k.

In an embodiment, as an example, the fourth mirror 46 is closer to the X− direction than the scan position P4 in the X direction. Moreover, the fourth mirror 46 is located closer to the X+ direction than the third mirror 45 in the X direction. The configuration position of the fourth mirror 46 and the angle of inclination of the fourth mirror 46 with respect to the horizontal plane are determined by the targeted scan position P04.

The first end E1 of the fourth mirror 46 in the second optical system 60B, although not shown in FIG. 2, is fixedly supported on the housing 40 like the first end E1 of the fourth mirror 46 in the first optical system 60A.

As shown in FIG. 2, the second end E2 of the fourth mirror 46 in the second optical system 60B is movably fixed via a cam 54A (a fourth supporting unit) in a second mirror adjustment section 52 and a pressure spring 50 which are described later.

The angle of inclination of the fourth mirror 46 in the second optical system 60B with respect to the horizontal plane may be different from that of inclination of the fourth mirror 46 in the first optical system 60A. The pressure spring 50 presses the reflecting surface Ma matching with the angle of inclination of the fourth mirror 46 in the second optical system 60B.

The sixth mirror 48 (a third reflecting mirror) in the second optical system 60B is arranged on the optical path of the laser beam L3 reflected by the fifth mirror 47. The sixth mirror 48 reflects the laser beam L3 towards the scan position P3 on the photoconductive drum 25c.

In an embodiment, in the X direction, the sixth mirror 48 is close to the X− direction with respect to the scan position P3, and the sixth mirror 48 is close to the X+ direction with respect to the fifth mirror 47. The configuration position of the sixth mirror 48 and the angle of inclination of the sixth mirror 48 with respect to the horizontal plane are determined by the targeted scan position P03.

The first end E1 of the sixth mirror 48 in the second optical system 60B, although not shown in FIG. 2, is fixedly supported on the housing 40 like the first end E1 of the sixth mirror 48 in the first optical system 60A.

As shown in FIG. 2, the second end E2 of the sixth mirror 48 in the second optical system 60B is movably fixed via a cam 54B (a third supporting unit) in a second mirror adjustment section 52 and a pressure spring 50 which are described later.

The angle of inclination of the sixth mirror 48 in the second optical system 60B with respect to the horizontal plane may be different from but is approximate to that of inclination of the sixth mirror 48 in the first optical system 60A. Thus, the pressure spring 50 can be shared.

Sequentially, the first mirror adjustment section 51 in the laser scanning unit 26 is described below.

As shown in FIG. 4, the first mirror adjustment section 51 movably supports the second ends E2 of the fourth mirror 46 and the sixth mirror 48 in the first optical system 60A.

The first mirror adjustment section 51 comprises cams 54A and 54B and a drive portion 53A.

As shown in FIG. 6B, the cam 54A has a shaft portion 54a and a cam portion 54b.

The shaft portion 54a extends along a central axis O54A. A gear section 54e is formed on a first end e1 of the shaft portion 54a in the length direction of the shaft portion 54a. The cam portion 54b is formed on a second end e2 of the shaft portion 54a which is opposite to the first end e1. The cam portion 54b is fixed on or integrated with the shaft portion 54a.

As shown in FIG. 6A, the cam portion 54b takes the shape of a plate extending in the peripheral direction of the shaft portion 54a. A peripheral surface 54c is formed on the periphery of the shaft portion 54a.

The distance rp between a point P on the peripheral surface 54c and the central axis O54A changes in the circumferential direction of the peripheral surface 54c. The point a represents the position the distance rp is a minimal distance rpmin. The distance rp is a function of the rotation angle θ of the point a. The distance rp reaches the maximum value rpmax (wherein rpmin<rpmax) when θ=θc (refer to the point c) (0<θc<2π). The distance rp is rpmid when θ=θb=θc/2 (refer to the point b), wherein rpmid is (rpmin+rpmax)/2. The distance rp is a linear monotone increasing function of the angle θ on a path from the point a through the point b, to the point c. Further, if the rotation angle θ increases from the point c, then the distance rp decreases gradually. The point a is returned to when θ=2π. The distance rp is rpmin again when the point a is returned to.

A cam surface 54d is formed in the vicinity of the second end e2 on the peripheral surface 54c. The cam surface 54d is a curved surface rounded from an arc shape in a section of a plane containing the central axis O54A. The cam surface 54d is smoothly connected with the peripheral surface 54c.

It is assumed that the distance between each point q on the cam surface 54d and the central axis O54A is rq (rq≤rp). Further, the direction from the point q to the central axis O54A is fixed. In this case, the distance rq changes in the same way as the distance rp. The distance rq is rqmin, rqmid and rqmax when the angle θ is θa, θb and θc. Here, rqmid=(rqmin+rqmax)/2, rqmin=rpmin−δ, rqmax=rpmax−δ, wherein δ is a constant which is determined by the radius of curvature of the cam surface 54d and the angle of inclination of a mirror propped against the cam surface 54d.

Further, in the embodiment shown in FIG. 6A, the direction of the rotation along the points a, b and c is a clockwise direction when observed from the second end e2 towards the first end e1 (the Z− direction). However, in the embodiment shown in FIG. 6A, the direction of the rotation along the points a, b and c may also be an anticlockwise direction when observed from the second end e2 towards the first end e1.

As shown in FIG. 4, the cam 54A is mounted in the housing 40 together with a drive portion 53A which is described later. When the cam 54A is mounted in the housing 40, the shaft portion 54a penetrates the first supporting unit 40a. The cam portion 54b is located on the first supporting unit 40a nearby the second end E2 of the sixth mirror 48.

The cam surface 54d is propped against the back Mb of the sixth mirror 48 at the position where the cam portion 54b is located on the first supporting unit 40a. The angle of inclination of the sixth mirror 48 with respect to the horizontal plane is fixed by the mirror supporting unit 40c. Thus, the position where the cam surface 54d is propped against the back Mb is unchanged in a direction along the central axis O54A even if the cam surface 54d is rotated around the central axis O54A. Thus, the rate of the change of the distance θ between the back Mb and the central axis O54A is defined in a range of θa≤θ≤θc.

As shown in FIG. 5, the gear section 54e extends towards the inside of the drive portion 53A below the first supporting unit 40a.

The middle part of shaft portion 54a in the length direction is rotationally supported. The shaft portion 54a is supported by a bearing arranged on a casing 53a or the first supporting unit 40a (not shown). The central axis O54A of the shaft portion 54a extends along the vertical direction.

As shown in FIG. 6A and FIG. 6B, the cam 54B has the same shape with the cam 54A. The cam 54B is mounted in the housing 40 at a position different from the installation position of the cam 54A. As shown in FIG. 4, the cam 54B is mounted in the housing 40 with a drive portion 53A which is described later. When the cam 54A is mounted in the housing 40, the shaft portion 54a penetrates the first supporting unit 40a. The cam portion 54b of the cam 54B is positioned on the first supporting unit 40a nearby the second end E2 of the fourth mirror 46.

The cam surface 54d of the cam 54B is propped against the back Mb of the fourth mirror 46 at the position where the cam portion 54b of the cam 54B is positioned on the first supporting unit 40a.

As shown in FIG. 5, the gear section 54e of the cam 54B extends towards the inside of the drive portion 53A below the first supporting unit 40a. The shaft portion 54a of the cam 54B is supported in the same way as the shaft portion 54a of the cam 54A except for being supported at a different position.

As shown in FIG. 4, the drive portion 53A has a casing 53a. As shown in FIG. 5, the drive portion 53A further comprises a motor 55 (a first drive source), a two-speed gear 56 and two-speed gears 57A and 57B which are both equipped with a one-way clutch.

The two-speed gear 56 and the two-speed gears 57A and 57B equipped with a one-way clutch are accommodated in the casing 53a. The casing 53a which fixes the motor 55 is fixed in the housing 40. In an embodiment, the casing 53a is configured under the first supporting unit 40a.

A shaft section or bearing section (not shown) is arranged in the casing 53a. The shaft section or bearing section is capable of rotationally supporting the two-speed gear 56, the two-speed gears 57A and 57B equipped with a one-way clutch and the cams 54A and 54B.

The motor 55 generates a power for the cams 54A and 54B. The motor 55 has an output shaft 55b for power transmission. As shown in FIG. 8A, the output shaft 55b rotates around a central axis O55. The output shaft 55b can be switched between forward rotation and reverse rotation. Thus, the drive direction of the motor 55 can be switched.

Further, FIG. 8A is a schematic diagram illustrating the drive portion 53A observed from the motor 55 towards the Z+ direction.

The first drive direction of the output shaft 55b is the anticlockwise rotation shown in FIG. 8A (hereinafter referred to as CCW.). The second drive direction of the output shaft 55b is the clockwise rotation shown in FIG. 8A (hereinafter referred to as CW.). The rotation along the first drive direction is hereinafter referred to as forward rotation and that along the second drive direction as reverse rotation in some cases.

Moreover, when observed from different directions, the rotation direction is different.

The anticlockwise rotation and the clockwise rotation observed from the motor 55 in the drive portion 53A along the Z+ direction are hereinafter abbreviated to CCW rotation and CW rotation, respectively. If the rotation direction is observed from a different direction, the observation rotation should be defined. In this case, the rotation directions are marked as anticlockwise rotation and clockwise rotation.

A motor gear 55a (refer to FIG. 8A) is fixed on the front end of the output shaft 55b.

No specific limitations are given to the type of the motor 55 as long as the motor 55 is capable of rotating forwards and reversely and being kept at a rotation position. The motor 55 is, for example, a step motor. The motor 55 may have the origin detection function, but it is not necessary for the motor 55 to have an origin detection function.

A power source and a control circuit for the drive of the motor 55 are built in the laser scanning unit 26 and the image forming apparatus 100. If the motor 55 is adjusted only when being produced, then the power source and the control circuit for the drive of the motor 55 may be arranged outside the laser scanning unit 26 and the image forming apparatus 100 as drive tools.

The two-speed gear 56 comprises a first gear 56a and a second gear 56b. The first gear 56a and the second gear 56b are reduction gears which are coaxially arranged with respect to the central axis O56. The central axis O56 is parallel to the central axis O55.

The two-speed gear 56 is rotationally supported by a rotating support shaft or bearing (not shown) arranged in the casing 53a.

The first gear 56a is meshed with the motor gear 55a. The number of the teeth of the first gear 56a is smaller than that of the teeth of the second gear 56b.

When the first gear 56a rotates, the second gear 56b rotates in the same direction. The two-speed gears 57A and 57B equipped with a one-way clutch are meshed with the second gear 56b.

The two-speed gear 57A equipped with a one-way clutch comprises an input-side gear 57a, an output-side gear 57b, a connection shaft section 57c and a one-way clutch 57d.

The input-side gear 57a, the output-side gear 57b, the connection shaft section 57c and the one-way clutch 57d are coaxially configured around a central axis O57A which is parallel to the central axis O56. The two-speed gear 57A equipped with a one-way clutch is rotationally supported by a rotating support shaft or a bearing (not shown) arranged in the casing 53a.

The input-side gear 57a is meshed with the second gear 56b.

The output-side gear 57b is meshed with the gear section 54e of the cam 54A. Thus, the central axis O57A is also parallel to the central axis O54A.

No specific limitations are given to the relation between the tooth numbers of the input-side gear 57a and the output-side gear 57b. In an embodiment, as an example, the tooth number of the output-side gear 57b is greater than that of the input-side gear 57a.

The connection shaft section 57c and the one-way clutch 57d are connected with the input-side gear 57a and the output-side gear 57b. The connection shaft section 57c and the one-way clutch 57d transmit CW rotation to the output-side gear 57b only when the input-side gear 57a is in CW rotation. The output-side gear 57b is not rotated by the connection shaft section 57c and the one-way clutch 57d when the input-side gear 57a is in CCW rotation (refer to FIG. 8A).

If such a rotation control can be implemented, then the connection shaft section 57c and the one-way clutch 57d may be arranged on either of the input-side gear 57a and the output-side gear 57b.

For example, when the connection shaft section 57c is fixed on the input-side gear 57a, the one-way clutch 57d is fixed inside the output-side gear 57b. The connection shaft section 57c is inserted into the internal circumferential part of the one-way clutch 57d from the input-side gear 57a.

In this case, the connection shaft section 57c and the input-side gear 57a rotate in the same direction in a linked manner. However, the connection shaft section 57c and the one-way clutch 57d are only linked when the connection shaft section 57c is in CW rotation.

The one-way clutch 57d of the two-speed gear 57A equipped with a one-way clutch is replaced by a one-way clutch 57e in the two-speed gear 57B equipped with a one-way clutch. The two-speed gear 57B equipped with a one-way clutch is described below centering on the difference from the two-speed gear 57A equipped with a one-way clutch.

The rotation direction restricted by the one-way clutch 57e is opposite to that restricted by the one-way clutch 57d.

The input-side gear 57a, the output-side gear 57b, the connection shaft section 57c and the one-way clutch 57e are coaxially configured around a central axis O57B parallel to the central axis O56.

Like the input-side gear 57a of the two-speed gear 57A equipped with a one-way clutch, the input-side gear 57a of the two-speed gear 57B equipped with a one-way clutch is meshed with the second gear 56b.

The output-side gear 57b of the two-speed gear 57B equipped with a one-way clutch is meshed with the gear section 54e of the cam 54B. Thus, the central axis O57B is also parallel to the central axis O54A.

The connection shaft section 57c and the one-way clutch 57e are connected with the input-side gear 57a and the output-side gear 57b. The connection shaft section 57c and the one-way clutch 57e only transmit CCW rotation to the output-side gear 57b when the input-side gear 57a is in CCW rotation (refer to FIG. 8A). The output-side gear 57b is not rotated by the connection shaft section 57c and the one-way clutch 57e when the input-side gear 57a is in CW rotation (refer to FIG. 8B).

If such a rotation control can be implemented, then the connection shaft section 57c and the one-way clutch 57e may be arranged on either of the input-side gear 57a and the output-side gear 57b.

Sequentially, the second mirror adjustment section 52 in the laser scanning unit 26 is described below.

As shown in FIG. 7, the second mirror adjustment section 52 is capable of movably supporting the second ends E2 of the fourth mirror 46 and the sixth mirror 48 in the second optical system 60B.

The second mirror adjustment section 52 comprises cams 54A and 54B and a drive portion 53B.

The cams 54A and 54B of the second mirror adjustment section 52 are merely different from those of the first mirror adjustment section 51 in configuration position.

The second mirror adjustment section 52 is described below centering on the difference from those of the first mirror adjustment section 51. The identical components of the first and the second mirror adjustment section 51 and 52 are denoted by the same reference signs unless specified otherwise.

The cam 54A of the second mirror adjustment section 52 is mounted in the housing 40 together with a drive portion 53B which is described later. When the cam 54A is mounted in the housing 40, the shaft portion 54a penetrates the second supporting unit 40b. In the housing 40, the second supporting unit 40b is located on the end in the X+ side area which is close to the Y− direction. The cam portion 54b is positioned above the second supporting unit 40b in the vicinity of the second end E2 of the fourth mirror 46 of the second optical system 60B.

The cam surface 54d is propped against the back Mb of the fourth mirror 46 at the position the cam portion 54b is positioned above the second supporting unit 40b.

The middle part of the shaft portion 54a in the length direction of the shaft portion 54a is rotationally supported. The shaft portion 54a is supported by a casing (not shown) identical to the casing 53a or a bearing (not shown) arranged on the second supporting unit 40b. The central axis O54A of the shaft portion 54a extends along the vertical direction. The gear section 54e extends towards the inside of the drive portion 53B below the second supporting unit 40b.

The cam 54B of the second mirror adjustment section 52 is arranged in the housing 40 at a position different from the installation position of the cam 54A. The cam 54B is mounted in the housing 40 together with the drive portion 53B which is described later. When the cam 54A is mounted in the housing 40, the shaft portion 54a penetrates a second supporting unit 40b. The cam portion 54b of the cam 54B is positioned above the second supporting unit 40b in the vicinity of the second end E2 of the sixth mirror 48 of the second optical system 60B.

The cam surface 54d of the cam 54B is propped against the back Mb of the sixth mirror 48 at the position where the cam portion 54b of the cam 54B is positioned above the second supporting unit 40b.

The central axis O54B of the shaft portion 54a of the cam 54B extends along the vertical direction. The gear section 54e of the cam 54B extends towards the inside of the drive portion 53B below the second supporting unit 40b. The shaft portion 54a of the cam 54B is supported in the same way as the shaft portion 54a of the cam 54A except for being supported at a different position.

Like the drive portion 53A, the drive portion 53B comprises a motor 55 (a second drive source), a two-speed gear 56 and two-speed gears 57A and 57B equipped with a one-way clutch.

The two-speed gear 56 and the two-speed gears 57A and 57B equipped with a one-way clutch are accommodated in the casing (not shown) of the drive portion 53B. The casing which fixes the motor 55 is fixed in the housing 40. In an embodiment, the casing is configured below the second supporting unit 40b.

A shaft section or bearing section (not shown) is arranged inside the casing. The shaft section or bearing section is capable of rotationally supporting the two-speed gear 56, the two-speed gears 57A and 57B which are equipped with a one-way clutch and the cams 54A and 54B.

As shown in FIG. 8A, the motor 55, the two-speed gear 56 and the two-speed gears 57A and 57B equipped with a one-way clutch of the drive portion 53B are arranged in the same way as those of the drive portion 53A, if observed from the motor 55. Thus, the relationship between the rotation directions of the motor 55 and the cams 54A and 54B of the drive portion 53B is identical to that between the rotation directions of the motor 55 and the cams 54A and 54B of the drive portion 53A.

Above is description of the laser scanning unit 26.

Return to FIG. 1 to continue to describe the other components of the image forming apparatus 100.

The intermediate transfer belt 27 consisting of an annular belt comprises a plurality of rollers which are propped against the internal circumferential surface of the intermediate transfer belt 27. The plurality of rollers applies a tension to the intermediate transfer belt 27. The intermediate transfer belt 27 is flatly established.

The transfer belt roller 32 guides the intermediate transfer belt 27 to a cleaning position.

Image forming units 25Y, 25M, 25C and 25K are orderly arranged from a transfer belt roller 32 to a transfer unit 28 excluding the transfer rollers below the intermediate transfer belt 27. The image forming units 25Y, 25M, 25C and 25K are arranged at intervals in an area between the transfer belt roller 32 and a supporting roller 28a.

A developing agent containing a yellow toner, a developing agent containing a magenta toner, a developing agent containing a cyan toner and a developing agent containing a black toner are accommodated in the developers of the image forming units 25Y, 25M, 25C and 25K, respectively. The developers develop the electrostatic latent images on the photoconductive drums 25y, 25m, 25c and 25k. Consequentially, toner images are formed on the photoconductive drums 25y, 25m, 25c and 25k.

The transfer rollers of the image forming units 25Y, 25M, 25C and 25K transfer (primarily transfer) the toner images on the surfaces of the photoconductive drums 25y, 25m, 25c and 25k onto the intermediate transfer belt 27.

A transfer bias is applied to each transfer roller when the toner images reach a primary transfer position.

The cleaning units of the image forming units 25Y, 25M, 25C and 25K erase the toner not transferred in the primary transfer on the surface of the photoconductive drums.

The destaticizer of each of the image forming units 25Y, 25M, 25C and 25K irradiates the surface of the photoconductive drum passing through the cleaning unit with light. The destaticizers remove the charges of the photoconductive drums 25y, 25m, 25c and 25k, respectively.

In the intermediate transfer belt 27, a transfer unit 28 is arranged adjacent to the image forming unit 25K.

The transfer unit 28 comprises a supporting roller 28a and a secondary transfer roller 28b. The secondary transfer roller 28b and the supporting roller 28a clamp the intermediate transfer belt 27. The position where the secondary transfer roller 28b is propped against the intermediate transfer belt 27 is a secondary transfer position.

The transfer unit 28 transfers the toner image on the intermediate transfer belt 27 onto the surface of a sheet S at the secondary transfer position. The transfer unit 28 applies a transfer bias to the secondary transfer position. The transfer unit 28 transfers the toner image on the intermediate transfer belt 27 onto the sheet S via the transfer bias.

The fixer 29 applies heat and pressure to the sheet S. The fixer 29 fixes the toner image transferred on the sheet S by means of the heat and the pressure.

The transfer belt cleaning unit 31 is arranged opposite to the transfer belt roller 32. The transfer belt cleaning unit 31 clamps the transfer belt 27. The transfer belt cleaning unit 31 erases the toner on the surface of the transfer belt 27. The transfer belt cleaning unit 31 recycles the erased toner into a waste toner tank.

The printer unit 3 further comprises a reversing unit 30. The reversing unit 30 reverses the sheet discharged from the fixer 29 through a switchback route. The reversing unit 30 conveys a reversed sheet S into a conveyance guider in front of the resist roller 24 again. The reversing unit 30 reverses the sheet S so as to form an image on the back of the sheet S.

The controller 6 controls each component of the image forming apparatus 100.

The actions of the image forming apparatus 100 are described below.

In the image forming apparatus 100, an image formation instruction is input to the controller 6 from the control panel 1 or from the outside. The controller 6 causes the printer unit 3 to start to form an image. The printer unit 3 feeds a sheet S of a proper size from the sheet feed unit 4 to the resist roller 24.

The printer unit 3 forms a latent image on the photoconductive drums 25y, 25m, 25c and 25k through the laser scanning unit 26. That is, the laser light sources emit laser beams L1, L2, L3 and L4 modulated according to image information.

As shown in FIG. 2, for example, the laser beams L1, L2, L3 and L4 are imaged on the polygon mirror 41a via a cylindrical lens (not shown). The laser beams L1, L2, L3 and L4 carry out a deflective scan in the primary scanning direction through the rotation of the polygon mirror 41a. The scanning direction of the laser beams L1 and L2 is opposite to that of the laser beams L3 and L4. In order not to reflect an image, image information is provided matching with the scanning direction.

For example, the laser beam L1 (L4) forms an image on the photoconductive drum 25y (25k) by means of the first optical system 60A (the second optical system 60B). The laser beam L1 (L4) reflected by the polygon mirror 41a is transmitted to the photoconductive drum 25y (25k) via the first lens 42A, the first mirror 43, the second lens 42B, the second mirror 44, the third mirror 45 and the fourth mirror 46.

For example, the laser beam L2 (L3) forms an image on the photoconductive drum 25m (25c) by means of the first optical system 60A (the second optical system 60B). The laser beam L2 (L3) reflected by the polygon mirror 41a is transmitted to the photoconductive drum 25m (25c) via the first lens 42A, the first mirror 43, the second lens 42B, the second mirror 44, the fifth mirror 47 and the sixth mirror 48.

The laser beams L1, L2, L3 and L4 scan at the scan positions P1, P2, P3 and P4, respectively. If no error occurs in the production or configuration of the optical elements in the optical write system 60, then the scan positions P1, P2, P3 and P4 are overlapped with the targeted scan positions P01, P02, P03 and P04. However, it is impossible that the production error or configuration error of the optical elements is 0. Thus, the scan lines of the laser beams L1, L2, L3 and L4 are deviated from the targeted scan positions P01, P02, P03 and P04.

For this reason, in the image forming apparatus 100, the scan lines of the laser beams L1, L2, L3 and L4 are adjusted at least when the laser scanning unit 26 is assembled. In the image forming apparatus 100 of an embodiment, the slopes of the scan lines are adjusted so that the scan lines of the laser beams L1, L2, L3 and L4 are parallel to the targeted scan positions P01, P02, P03 and P04. This is because that the position of the latent image in the secondary scanning direction can be adjusted by controlling the timing at which the latent image is formed even if each scan line is deviated from each targeted scan position in parallel.

In the image forming apparatus 100, the slope of the scan line can be adjusted after the laser scanning unit 26 is assembled. For example, after being delivered from the factory, the image forming apparatus 100 is vibrated or impacted in some cases. Sometimes, after being delivered from the factory, the image forming apparatus 100 is thermally deformed because of temperature. In this case, the position of each photoconductive drum or laser scanning unit 26 may vary. In the image forming apparatus 100, the slope of the scan line generated in this case may be adjusted.

The actions related to the adjustment of the slope of the scan line are described later.

In this way, electrostatic latent images are formed on the photoconductive drums 25y, 25m, 25c and 25k corresponding to different image information.

The image forming units 25Y, 25M, 25C and 25K develop the electrostatic latent images formed on the photoconductive drums 25y, 25m, 25c and 25k via the developers. Toner images are formed on the surfaces of the photoconductive drums 25y, 25m, 25c and 25k corresponding to the electrostatic latent images.

Each toner image is primarily transferred on the intermediate transfer belt 27 via each transfer roller. At this time, transfer timings are appropriately staggered according to the arrangement positions of the image forming units 25Y, 25M, 25C and 25K. As a result, the toner images are orderly overlapped without color deviation as the intermediate transfer belt 27 moves. Each toner image is sent to the transfer unit 28.

The toner image reaching the transfer unit 28 is secondarily transferred on the sheet S conveyed from the resist roller 24 to the transfer unit 28. The secondarily transferred toner image is fixed on the sheet S by the fixer 29. The sheet S on which the toner image is fixed is discharged to the outside of the image forming apparatus 100.

The residual toner that is not transferred onto the sheet S by the transfer unit 28 is erased by the transfer belt cleaning unit 31. The intermediate transfer belt 27 is cleaned to be reusable.

Then, the formation of an image on a sheet S is ended.

Next, the actions related to the adjustment of the slope of the scan line are described later.

Figure 8B:
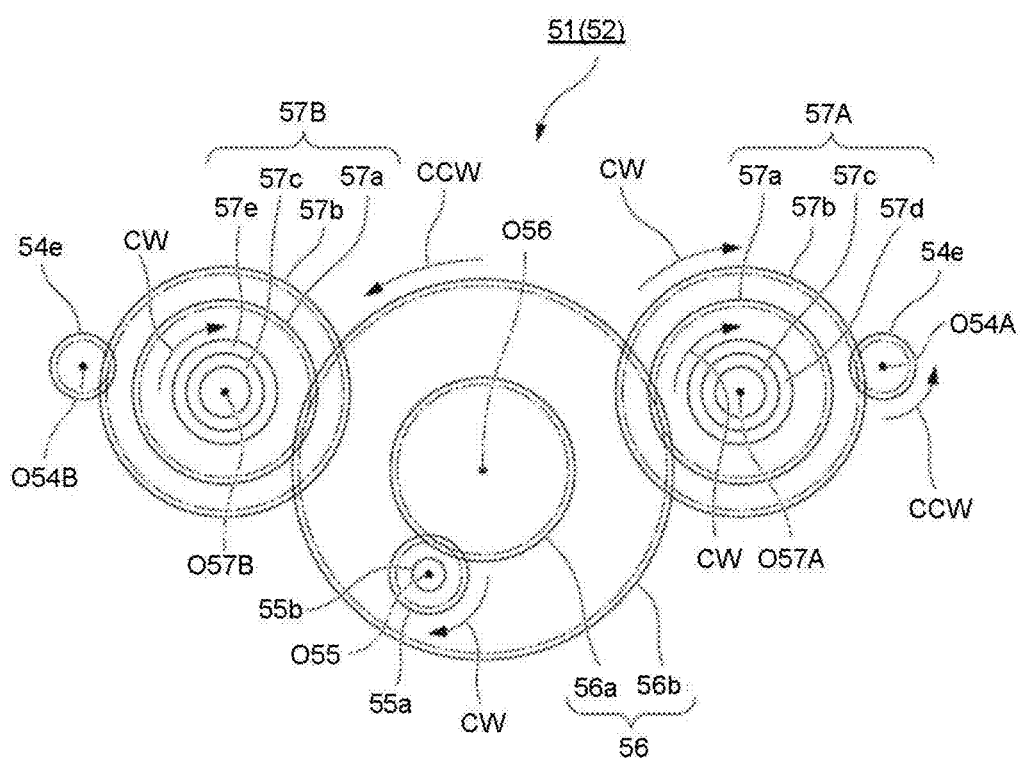
FIG. 8B is a schematic diagram illustrating the actions of a mirror position adjustment section of an image forming apparatus according to an embodiment.
Figure 9:
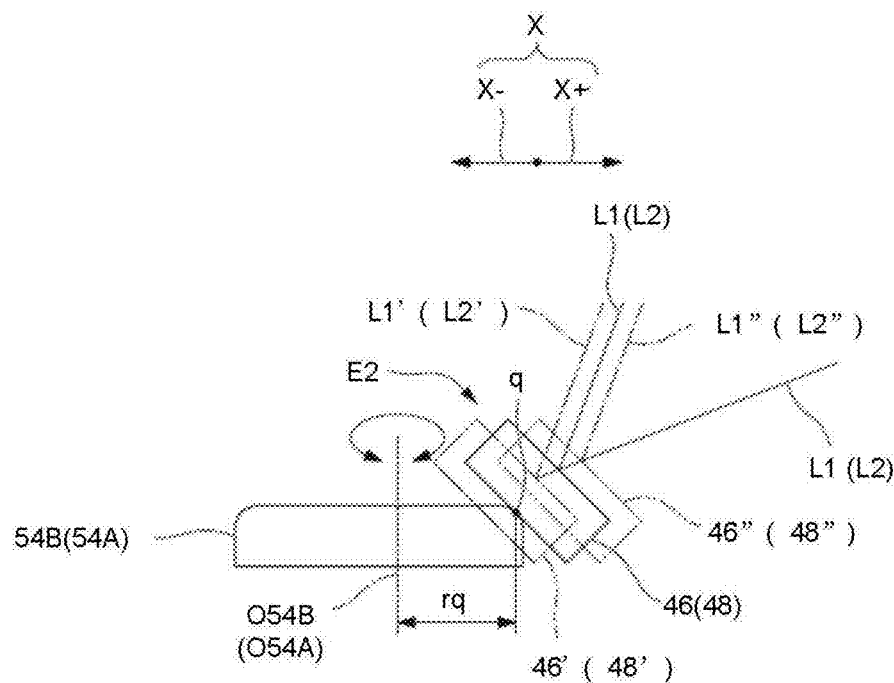
FIG. 9 is a frontal view schematically illustrating the movement of a mirror by a mirror position adjustment section of an image forming apparatus according to an embodiment.
Figure 10:
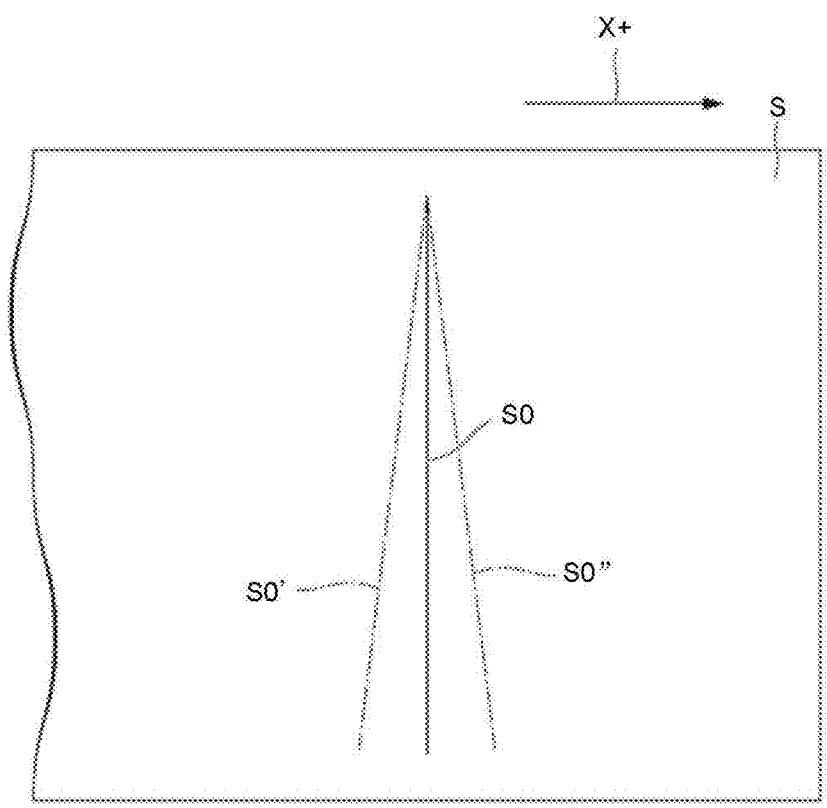
FIG. 10 is a schematic diagram illustrating the change in the slope of a scan line on a sheet on a mirror position adjustment section of an image forming apparatus according to an embodiment.

FIG. 8B is a schematic diagram illustrating the actions of a mirror position adjustment section of an image forming apparatus according to an embodiment. FIG. 9 is a frontal view schematically illustrating the movement of a mirror by a mirror position adjustment section of an image forming apparatus according to an embodiment. FIG. 10 is a schematic diagram illustrating the change in the slope of a scan line on a sheet on a mirror position adjustment section of an image forming apparatus according to an embodiment.

The first mirror adjustment section 51 and the second mirror adjustment section 52 are used in the adjustment of the slope of a scan line. The first mirror adjustment section 51 moves the second ends E2 of the fourth mirror 46 and the sixth mirror 48 in the first optical system 60A towards the X direction. The second mirror adjustment section 52 moves the second ends E2 of the fourth mirror 46 and the sixth mirror 48 in the second optical system 60B towards the X direction.

For example, in order to move the second end E2 of the fourth mirror 46 in the first optical system 60A, the motor 55 of the first mirror adjustment section 51 is rotated counterclockwise.

When the motor 55 is in the CCW rotation, the two-speed gear 56 is rotated, clockwise, as shown in FIG. 8A. The input-side gears 57a of the two-speed gears 57B and 57A equipped with a one-way clutch are rotated counterclockwise.

In this case, in the two-speed gear 57B equipped with a one-way clutch, the one-way clutch 57e transmits the movement of the input-side gear 57a to the output-side gear 57b. Thus, the output-side gear 57b is rotated counterclockwise together with the input-side gear 57a. The output-side gear 57b causes the gear section 54e of the cam 54B to rotate clockwise.

On the other hand, in the two-speed gear 57A equipped with a one-way clutch, the one-way clutch 57d is ineffective in transmitting the movement of the input-side gear 57a to the output-side gear 57b. Thus, only the input-side gear 57a is rotated counterclockwise. As a result, the gear section 54e of the cam 54A is not rotated.

When the cam 54B is rotated clockwise, the cam surface 54d shown in FIG. 6A, when observed from above the cam 54B along the Z– direction, is rotated anticlockwise. For example, in the cam 54B, it is assumed that the θ in the direction in which the cam 54B is propped against the fourth mirror 46 is θb. The distance rq from the position where the cam 54B is propped against the fourth mirror 46 to the central axis O54B is rqmid. In this case, the angle θ is decreased towards the angle θa as the cam 54B is rotated clockwise. The distance between the position where the fourth mirror 46 is propped and the central axis O54B is linearly reduced till the angle θ reaches the angle θa.

For example, as shown in FIG. 9, the second end E2 of the fourth mirror 46 is supported at the position indicated by the solid lines at the beginning of an adjustment. In this case, when the cam 54B is rotated clockwise, the second end E2 of the fourth mirror 46 is moved towards the X– direction (refer to the fourth mirror 46').

Thus, the laser beam L1 reflected by the second end E2 of the fourth mirror 46 is moved towards the X– direction (refer to the laser beam L1') from the scan position of the laser beam L1 at the beginning of the adjustment. In this case, the amount of the movement of the fourth mirror 46 towards the X direction is changed in proportion to the change in the rotation angle of the motor 55.

The fourth mirror 46 is extremely moved towards the X-direction when θ=θa. The distance rq is rqmin.

Further, when the cam 54B is rotated clockwise, the angle θ changes from θa to θc. During this period, the fourth mirror 46 is moved towards the X+ direction. The fourth mirror 46 is extremely moved towards the X+ direction (refer to the laser beam L1″) when θ=θc. The distance rq is rqmax.

Further, when the cam 54B is rotated clockwise, the angle θ changes from θc to θb. During this period, the fourth mirror 46 is moved towards the X− direction. In this case, the amount of the movement of the fourth mirror 46 towards the X direction is changed in proportion to the change of the rotation angle of the motor 55.

In this way, the position of the second end E2 of the fourth mirror 46 in the X direction is changed when the motor 55 is rotated counterclockwise. The amplitude of the change in the X direction ranges from rqmax to rqmin.

On the other hand, the first end E1 of the fourth mirror 46 is fixed at the position of the supporting protrusion 40d.

Thus, the slope of the scan line of the laser beam L1 on the photoconductive drum 25y is changed. The slope of the latent image formed by the laser beam L1 is changed as well. As a result, for example, if line images formed in the primary scanning direction along the scan lines of the laser beams L1′, L1, L1″ are transferred on a sheet S, then the formed line images are S0′, S0 and S0″, as shown in FIG. 10.

In order to move the second end E2 of the sixth mirror 48 in the first optical system 60A, the motor 55 of the first mirror adjustment section 51 is rotated clockwise.

When the motor 55 is in the CW rotation, as shown in FIG. 8B, the two-speed gear 56 is rotated counterclockwise. The input-side gears 57a of the two-speed gears 57B and 57A equipped with a one-way clutch are rotated clockwise. In this case, the one-way clutch 57d of the two-speed gear 57A equipped with a one-way clutch transmits the movement of the input-side gear 57a to the output-side gear 57b. Thus, the output-side gear 57b is rotated clockwise together with the input-side gear 57a. The output-side gear 57b causes the gear section 54e of the cam 54A to rotate counterclockwise.

On the other hand, in the two-speed gear 57B equipped with a one-way clutch, the one-way clutch 57e is ineffective in transmitting the movement of the input-side gear 57a to the output-side gear 57b. Thus, only the input-side gear 57a is rotated clockwise. Consequentially, the gear section 54e of the gear 54B is not rotated.

The position of the second end E2 of the sixth mirror 48 in the X direction is changed when the cam 54A is rotated counterclockwise, like when the cam 54B rotates. Thus, the slope of the scan line of the laser beam L2 is adjusted.

In this way, in the first mirror adjustment section 51, the slopes of the scan lines of the laser beams L1 and L2 can be adjusted by switching between the rotation directions of the motor 55.

Likewise, the second mirror adjustment section 52 is capable of moving the fourth mirror 46 and the sixth mirror 48 of the second optical system 60B. For example, the sixth mirror 48 of the second optical system 60B is moved when the motor 55 of the second mirror adjustment section 52 is rotated clockwise. Thus, the slope of the scan line of the laser beam L3 is adjusted. Further, the fourth mirror 46 of the second optical system 60B is moved when the motor 55 of the second mirror adjustment section 52 is rotated counterclockwise. Thus, the slope of the scan line of the laser beam L4 is adjusted.

The slopes of the scan lines of the laser beams L1, L2, L3 and L4 are adjusted while the slopes of the scan lines are detected directly or indirectly. To detect the slopes of the scan lines directly, position sensors such as CCDs are configured on at least two positions of the scan lines on the image surfaces of the laser beams L1, L2, L3 and L4 or at equivalent positions. The position sensor may be configured inside the image forming apparatus 100 or on a special measurement clamp for fixing the laser scanning unit 26.

To detect the slope of the scan line indirectly, the position of a toner image for developing a latent image corresponding to a scan line is measured. Further, the position of the toner image transferred on the intermediate transfer belt 27 may also be detected. For example, the image forming apparatus 100 forms a toner image of a proper pattern for detecting the position of a scan line. The image forming apparatus 100 transfers the toner image onto the intermediate transfer belt 27. The image forming apparatus 100 is provided with an optical sensor which is configured at a proper position on the intermediate transfer belt 27 to detect the position of a toner image. The optical sensor may be configured, for example, on the intermediate transfer belt 27 on the supporting roller 28a. The optical sensor may be, for example, an optical reflecting sensor. The image forming apparatus 100 detects the slope of a scan line according to the position of the scan line detected by the optical sensor.

When a toner image is formed to detect the slope of a scan line, the slope of the scan line can be easily detected even after the laser scanning unit 26 is assembled in the image forming apparatus 100. In this case, the image forming apparatus 100 delivered from the factory is still capable of detecting the slope of a scan line.

As stated above, in the image forming apparatus 100, the laser light sources, the cylindrical lenses, the polygon motors 41 and the fθ lens 42 in the laser scanning unit 26 constitute an optical scanning unit. The optical scanning unit generates a laser beam L1 (a first scanning beam), a laser beam L2 (a second scanning beam), a laser beam L3 (a third scanning beam) and a laser beam L4 (a fourth scanning beam).

In the first mirror adjustment section 51 of the laser scanning unit 26, the movement of the motor 55 (first drive source) is transmitted via the two-speed gear 57B (first transmission unit) equipped with a one-way clutch and the two-speed gear 57A (second transmission unit) equipped with a one-way clutch. When the motor gear 55a is rotated counterclockwise as the motor 55 is driven towards the first drive direction, the cam 54B (first supporting unit) is rotated clockwise. When the motor gear 55a is rotated clockwise as the motor 55 is driven towards the second drive direction, the cam 54A (second supporting unit) is rotated counterclockwise. Thus, according to the direction towards which the motor 55 is driven, one of the fourth mirror 46 (first reflecting mirror) and the sixth mirror 48 (second reflecting mirror) of the first optical system 60A is moved towards the X direction intersecting with the length direction. The first mirror adjustment section 51 adjusts the slopes of the scan lines of the laser beams L1 and L2 via one motor 55.

Similarly, in the second mirror adjustment section 52, the movement of the motor 55 (second drive source) is transmitted via the two-speed gear 57B (third transmission unit) equipped with a one-way clutch and the two-speed gear 57A (fourth transmission unit) equipped with a one-way clutch. When the motor gear 55a is rotated clockwise as the motor 55 is driven towards the first drive direction, the cam 54B (third supporting unit) is rotated clockwise. When the motor gear 55a is rotated clockwise as the motor 55 is driven towards the second drive direction, the cam 54A (fourth supporting unit) is rotated counterclockwise. Thus, according to the direction towards which the motor 55 is driven, one of the fourth mirror 46 (third reflecting mirror) and the sixth mirror 48 (fourth reflecting mirror) of the second optical system 60B is moved towards the X direction intersecting with the length direction. In this way, the second mirror adjustment section 52 adjusts the slopes of the scan lines of the laser beams L3 and L4 via one motor 55.

Thus, the image forming apparatus 100 are provided with less motors 55 and less drive circuits than an image forming apparatus in which the slopes of the scan lines of the laser beams L1, L2, L3 and L4 are separately adjusted by independent drive sources. Thus, the cost of the image forming apparatus 100 is reduced.

Variations of the foregoing embodiments are described below.

It is described above that in the image forming apparatus 100 of the foregoing embodiment, the slopes of the scan lines of the laser beams L1, L2, L3 and L4 are adjusted independently. However, if each scan line is a scan line the slope of which is within an allowable range, then the other three scan lines may be parallel. Thus, one of the fourth mirrors 46 and one of the sixth mirrors 48 may be fixedly supported. For example, in the case where the sixth mirror 48 of the second optical system 60B is fixedly supported, the cam 54B of the fourth mirror 46 of the second optical system 60B may also be driven by an independent drive source but not the second mirror adjustment section 52.

In the image forming apparatus 100 of the foregoing embodiment, a latent image is exemplarily formed by four scanning beams. However, the scanning beams may be increased or decreased as needed. For example, the number of the scanning beams may be n if there are n image forming units n≥5). In this case, if n is an even number, then the number of the components identical to the first mirror adjustment sections 51 may be n/2. If n is an odd number, then the number of the components identical to the first mirror adjustment sections 51 may be m (1≤m≤(n−1)/2). In this case, cams are separately driven by (n−m) independent drive sources.

In the foregoing image forming apparatus 100, the laser beams L1 and L2 and laser beams L3 and L4 are separately distributed to the X− direction and the X+ direction by polygon motors 41. However, the laser beams L1, L2, L3 and L4 are not limited to carry out a distributed scan. For example, all the laser beams may be reflected at the same position by one polygon motor in the horizontal plane and scan in the reflection direction. Further, the laser beams may scan via more than two polygon motors.

In the foregoing image forming apparatus 100, in the optical path of each scanning beam, the reflecting mirror for adjusting the slope of the scan line is closest to the scan position. However, if the reflecting mirror is a reflecting mirror capable of independently adjusting the slope of a scan line, then the reflecting mirror may not be closest to the scan position. For example, in the image forming apparatus 100, each third mirror 45 and each fifth mirror 47 may also be moved.

In the foregoing image forming apparatus 100, the first, the second, the third and the fourth supporting unit each consist of a rotationally driven cam. However, each supporting unit may also consist of a linearly moved cam. Further, if the reflecting mirror can be moved towards a direction intersecting with the length direction, then each supporting unit is not necessarily to be a cam. For example, the supporting unit may be a moving body (thruster) of a proper shape which is capable of supporting the reflecting mirror in a direction intersecting with the length direction in a retractable manner.

In the foregoing image forming apparatus 100, the drive source consists of a motor having a rotation shaft. However, the drive source can be any drive source that is capable of moving the supporting unit, but not limited to a motor having a rotation shaft. For example, the drive source may be a linear motor or a driver acting in a monaxial direction.

Further, if the drive source moves linearly, a drive transmission mechanism may be arranged between the drive source and the supporting unit to convert the linear movement into a rotation movement. Further, if the drive source moves rotationally, a drive transmission mechanism may be arranged between the drive source and the supporting unit to convert the rotation movement into a linear movement.

In the foregoing image forming apparatus 100, the first, the second, the third and the fourth transmission units are all provide with a one-way clutch. However, the transmission unit is not limited to be equipped with a one-way clutch as long as the transmission unit is capable of controlling the transmission of the movement of the supporting unit according to the drive direction of the drive source. For example, the transmission unit may be provided with an electromagnetic clutch.

In the foregoing image forming apparatus 100, the second ends of the first, the second, the third and the fourth reflecting mirrors are movably supported by the first, the second, the third and the fourth supporting unit. However, the first ends of the first, the second, the third and the fourth reflecting mirrors may be movably supported. Further, the movably supported end may change in the first optical system 60A and the second optical system 60B.

In accordance with at least one of the foregoing embodiments, an image forming apparatus comprises an optical scanning unit, a first reflecting mirror, a second reflecting mirror, a first supporting unit, a second supporting unit, a first drive source, a first transmission unit and a second transmission unit. Thus, the image forming apparatus is provided with less drive sources and less drive circuits than an image forming apparatus in which the slopes of the scan lines of the laser beams L1 and L2 are separately adjusted by independent drive sources. Thus, the cost of the image forming apparatus is reduced.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
   an optical scanning unit configured to generate a first scanning beam for forming a latent image at a first scan position and a second scanning beam for forming a latent image at a second scan position;
   a first reflecting mirror configured to guide the first scanning beam to the first scan position;
   a second reflecting mirror configured to guide the second scanning beam to the second scan position, the second reflecting mirror being located at a position different from the first reflecting mirror in a vertical direction;
   a first supporting unit configured to movably support, in a direction intersecting with a length direction of the first reflecting mirror, an end of the first reflecting mirror from below in the length direction of the first reflecting mirror, the first supporting unit having a first gear section configured to be rotatable around a vertical axis;

a second supporting unit configured to movably support, in a direction intersecting with a length direction of the second reflecting mirror, an end of the second reflecting mirror from below in the length direction of the second reflecting mirror, the second supporting unit having a second gear section configured to be rotatable around a vertical axis;

a first drive source configured to provide a first drive force in a first direction and a second drive force in a second direction, the first drive source being located lower than both the first supporting unit and the second supporting unit, the first drive source having a first driving gear configured to be rotatable around a vertical axis;

a first transmission unit configured to allow the first supporting unit to move by transmission of the first drive force to the first supporting unit and to allow the second supporting unit to be in a stopped state by non-transmission of the first drive force to the second supporting unit in a case where the first drive source provides the first drive force in the first direction, the first transmission unit being located between the first supporting unit and the first drive source in the vertical direction, the first transmission unit including a first gear train provided between the first driving gear and the first gear section; and a second transmission unit configured to allow the second supporting unit to move by transmission of the second drive force to the second supporting unit and to allow the first supporting unit to be in a stopped state by non-transmission of the second drive force to the first supporting unit in a case where the first drive source provides the second drive force in the second direction, the second transmission unit being located between the second supporting unit and the first drive source in the vertical direction, the second transmission unit including a second gear train provided between the first driving gear and the second gear section.

2. The image forming apparatus according to claim 1, wherein
each of the first supporting unit and the second supporting unit is a cam.

3. The image forming apparatus according to claim 2, wherein
the cam comprises:
a shaft section rotated by the first or second transmission unit; and
a cam surface, wherein a distance between the cam surface and the shaft section varies in a circumferential direction.

4. The image forming apparatus according to claim 3, wherein
a distance between the cam surface and the central axis varies in proportion to the rotation angle of the cam around the central axis.

5. The image forming apparatus according to claim 1, wherein
the first drive source is a motor.

6. The image forming apparatus according to claim 1, wherein
the first and the second transmission units are both equipped with a one-way clutch.

7. The image forming apparatus according to claim 1, wherein
the optical scanning unit further generates a third scanning beam for forming a latent image at a third scan position and a fourth scanning beam for forming a latent image at a fourth scan position;
the image forming apparatus further comprises: a third reflecting mirror configured to guide the third scanning beam to the third scan position;
a fourth reflecting mirror configured to guide the fourth scanning beam to the fourth scan position, the fourth reflecting mirror being located at a position different from the third reflecting mirror in the vertical direction;
a third supporting unit configured to movably support, in a direction intersecting with a length direction of the third reflecting mirror, an end of the third reflecting mirror from below in the length direction of the third reflecting mirror, the third supporting unit having a third gear section configured to be rotatable around a vertical axis;
a fourth supporting unit configured to movably support, in a direction intersecting with a length direction of the fourth reflecting mirror, an end of the fourth reflecting mirror from below in the length direction of the fourth reflecting mirror, the fourth supporting unit having a fourth gear section configured to be rotatable around a vertical axis;
a second drive source configured to provide a third drive force in a third direction and a fourth drive force in a fourth direction, the second drive source being located lower than both the third supporting unit and the fourth supporting unit, the second drive source having a second driving gear configured to be rotatable around a vertical axis;
a third transmission unit configured to allow the third supporting unit to move by transmission of the third drive force to the third supporting unit and to allow the fourth supporting unit to be in a stopped state by non-transmission of the third drive force to the fourth supporting unit in a case where the second drive source provides the third drive force in the third direction, the third transmission unit being located between the third supporting unit and the second drive source in the vertical direction, the third transmission unit including a third gear train provided between the second driving gear and the third gear section; and
a fourth transmission unit configured to allow the fourth supporting unit to move by transmission of the fourth drive force to the fourth supporting unit and to allow the third supporting unit to be in a stopped state by non-transmission of the fourth drive force to the third supporting unit in a case where the second drive source provides the fourth drive force in the fourth direction, the fourth transmission unit being located between the fourth supporting unit and the second drive source in the vertical direction, the fourth transmission unit including a fourth gear train provided between the second driving gear and the fourth gear section.

8. The image forming apparatus according to claim 1, wherein
the first reflecting mirror is the reflecting mirror nearest to the first scan position in the optical path of the first scanning beam; and
the second reflecting mirror is the reflecting mirror nearest to the second scan position in the optical path of the second scanning beam.

9. The image forming apparatus according to claim 1, wherein
- a first end of the first reflecting mirror in the length direction is fixed, and a second end of the first reflecting mirror in the length direction is movably supported by the first supporting unit; and
- a first end of the second reflecting mirror in the length direction is fixed, and a second end of the second reflecting mirror in the length direction is movably supported by the second supporting unit.

10. The image forming apparatus according to claim 1, wherein
- a movement direction of the first supporting unit in a case where the first drive source provides the first drive force is opposite to a movement direction of the second supporting unit in a case where the first drive source provides the second drive force.

\* \* \* \* \*